(12) United States Patent
Frankel et al.

(10) Patent No.: US 11,463,176 B2
(45) Date of Patent: Oct. 4, 2022

(54) OPTICAL INTERCONNECTS FOR A PROGRAMMABLE VIRTUALIZED SELF-OPTIMIZING SIGNAL PROCESSOR

(71) Applicant: Ciena Corporation, Hanover, MD (US)

(72) Inventors: Michael Y. Frankel, Bethesda, MD (US); Stephen B. Alexander, Annapolis, MD (US)

(73) Assignee: Ciena Corporation, Hanover, MD (US)

( * ) Notice: Subject to any disclaimer, the term of this patent is extended or adjusted under 35 U.S.C. 154(b) by 72 days.

(21) Appl. No.: 17/076,183

(22) Filed: Oct. 21, 2020

(65) Prior Publication Data

US 2022/0123841 A1      Apr. 21, 2022

(51) Int. Cl.
| | | |
|---|---|---|
| *H04B 10/00* | (2013.01) | |
| *H04B 10/572* | (2013.01) | |
| *H04B 10/40* | (2013.01) | |
| *H04B 10/54* | (2013.01) | |
| *H04B 10/548* | (2013.01) | |
| *H04B 10/516* | (2013.01) | |

(52) U.S. Cl.
CPC ........... *H04B 10/572* (2013.01); *H04B 10/40* (2013.01); *H04B 10/541* (2013.01); *H04B 10/5162* (2013.01); *H04B 10/548* (2013.01)

(58) Field of Classification Search
CPC .... H04B 10/572; H04B 10/40; H04B 10/541; H04B 10/5162; H04B 10/548; H04B 10/61; H04B 10/50; H04B 10/801; H04B 10/0793; H04B 10/0795; H04B 10/43; H04B 10/60
USPC ................ 398/135, 138, 140, 164, 174, 176
See application file for complete search history.

(56) References Cited

U.S. PATENT DOCUMENTS

| | | |
|---|---|---|
| 7,343,101 B1 | 3/2008 | Frankel et al. |
| 7,733,999 B2 | 6/2010 | Mateosky et al. |
| 7,805,078 B1 * | 9/2010 | Gerszberg .......... H04B 10/1123 398/19 |
| 7,822,958 B1 | 10/2010 | Allen et al. |
| 7,839,222 B2 | 11/2010 | Barrow et al. |

(Continued)

OTHER PUBLICATIONS

Atul Srivastava, Optical Integration and the Role of DSF Coherent Optics Modules, CTO, NTT Electronics—America, Market Watch OFC 2014, pp. 1-24, NTT Electronics Corp., 2013.

(Continued)

*Primary Examiner* — Hibret A Woldekidan
(74) *Attorney, Agent, or Firm* — Clements Bernard Baratta; Lawrence A. Baratta, Jr.; Christopher L. Bernard

(57) ABSTRACT

An electrical circuit package includes an electrical processing engine circuit configured to perform data processing; and one or more co-packaged coherent optical Input/Output (IO) modules interconnected to the electrical processing engine circuit, wherein the electrical processing engine circuit is configured to interface electrical data including an optical signal waveform representation to each of the one or more co-packaged coherent optical IO modules, and wherein the one or more co-packaged coherent optical IO modules are configured to coherently transmit and receive optical data based on the optical signal waveform representation. The electrical processing engine circuit can be configured to perform optical modulation and demodulation based on the optical signal waveform representation, in addition to the data processing.

16 Claims, 4 Drawing Sheets

(56) References Cited

U.S. PATENT DOCUMENTS

| | | |
|---|---|---|
| 7,920,796 B2 | 4/2011 | Brownlee et al. |
| 8,045,863 B2 | 10/2011 | Meagher et al. |
| 8,750,713 B2 | 6/2014 | Sheth et al. |
| 8,805,195 B2 | 8/2014 | Mateosky et al. |
| 8,884,649 B1 | 11/2014 | Mateosky et al. |
| 11,159,238 B1* | 10/2021 | Di Mola ............... H04B 10/506 |
| 2007/0283311 A1 | 12/2007 | Karoubalis et al. |
| 2008/0123779 A1 | 5/2008 | Norris |
| 2009/0245790 A1 | 10/2009 | Mizutani et al. |
| 2009/0316925 A1 | 12/2009 | Eisenfeld et al. |
| 2010/0178065 A1 | 7/2010 | Nishihara et al. |
| 2013/0051809 A1 | 2/2013 | Mehrvar et al. |
| 2013/0129349 A1* | 5/2013 | Maxik ............... H04B 10/116 398/34 |
| 2014/0099116 A1* | 4/2014 | Bai .................. H04B 10/6161 398/76 |
| 2014/0312931 A1 | 10/2014 | Mateosky et al. |
| 2014/0341595 A1 | 11/2014 | Harley et al. |
| 2015/0091003 A1 | 4/2015 | Kurokawa |
| 2015/0341138 A1* | 11/2015 | Ishihara ............... H04B 10/516 398/35 |
| 2015/0365177 A1 | 12/2015 | Blumenthal et al. |
| 2016/0087845 A1 | 3/2016 | Kaneriya et al. |
| 2016/0134375 A1* | 5/2016 | Kakande ................. H04J 14/02 398/135 |
| 2017/0111107 A1 | 4/2017 | Yamane |

OTHER PUBLICATIONS

K. Nordin et al., Coherent Optical Communication Systems in Digital Signal Processing, International Journal of Advanced Engineering Research and Technology (IJAERT), vol. 2 Issue 7, Oct. 2014, ISSN No. 2348-8190, pp. 228-232.

Norman L. Swenson, ClariPhy, Signal Processing ASICs for Optical Fiber Communications, Advanced Photonics for Communications Jul. 14, 2014, Advanced Photonics Plenary Session, 2014, ClariPhy Communications, Inc.

ViaSat., DSP IP Cores Optical Communications, ViaSar DSP cores increase optical channel throughput for 400G optical communications and beyond, 2011-2015 ViaSat, Inc.

Ciena, Enabling a Bigger and Smarter Network With Ciena's Wavelogic 3, pp. 1-5, 2013 Ciena Corporation.

* cited by examiner

OPTICAL INTERCONNECTS FOR A PROGRAMMABLE VIRTUALIZED SELF-OPTIMIZING SIGNAL PROCESSOR

FIELD OF THE DISCLOSURE

The present disclosure generally relates to optical networking. More particularly, the present disclosure relates to systems and methods for optical interconnects for a programmable virtualized self-optimizing signal processor.

BACKGROUND OF THE DISCLOSURE

Circuits, e.g., Application-Specific Integrated Circuits (ASICs), Field Programmable Gate Arrays (FPGAs), Graphics Processing Units (GPUs), Central Processing Units (CPUs), Tensor Processing Units (TPUs), and the like, are continuing to advance rapidly. For example, circuits are available with processing capabilities of 50 Tbps or more. As such, packaging has started to limit the electrical interconnect bandwidth into and out of these ASICs, and there is a movement toward co-packaged optical interconnects, i.e., Input/Output (IO), with the circuits. Optical IO engine packaging is improving rapidly and undergoing standardization, which will lead to lower costs. At the same time, electrical interfaces between ASICs and optical engines are being developed and standardized for Terabit level bandwidth, again leading to reduced cost and reduced power consumption. The conventional approach to co-packaged optical IO is short-reach (<2 km), focusing on Non-Return-to-Zero (NRZ), Pulse Amplitude Modulation (PAM), etc. For example, there is a Co-Packaged Optics Collaboration, available online at copackagedoptics.com.

Existing solutions address problems in their respective target areas, but currently do not address the problem of obtaining an efficient programmable optical modem dynamically adaptable to a variety of use cases including data center links, metro links, long-haul link, and RF antenna remoting links, with real-time channel optimization capability. That is, what has yet to be explored or suggested is a coherent co-packaged optical interconnect with modulation-related processing functions offloaded to the generic compute ASIC.

BRIEF SUMMARY OF THE DISCLOSURE

The present disclosure relates to systems and methods for optical interconnects for a programmable virtualized self-optimizing signal processor. Specifically, optical IO is replaced by a Coherent Electrical-Optical-Electrical (EOE) converter that converts between an electrical digitized waveform and optical signal. The electrical digitized waveform is passed to/from an off-the-shelf external electronic processing engine (e.g., commercial FPGA or GPU), such that signal de/modulation and processing, conditioning and optimization occurs in the electronic processing engine. The electronic processing engine can implement Machine Learning (ML) inference type signal decoding. In an embodiment, a separate ML engine periodically samples one of optical channels and performs ML based training and optimization, and then passes new learned model to the real-time inference engine. Thus, Modem adaptation occurs in-service and in real time. Adaptation can be controlled by user-defined policies and may be throughput, latency, spectral efficiency, format interoperability compliance, security, robustness, etc., and which may be dynamically changed in-service. Advantageously, this enables long-reach from co-packaged optical IO, such as addressing dynamically and flexibly optimizable optical modem targeting a wide variety of use cases including data center, Metro, long haul and RF antenna remoting optical links, all performed under user-specified policies. That is, these applications can avoid intermediate transponders, reducing cost, complexity, and the like.

In an embodiment, an electrical circuit package includes an electrical processing engine circuit configured to perform data processing; and one or more co-packaged coherent optical Input/Output (IO) modules interconnected to the electrical processing engine circuit, wherein the electrical processing engine circuit is configured to interface electrical data including an optical signal waveform representation to each of the one or more co-packaged coherent optical IO modules, and wherein the one or more co-packaged coherent optical IO modules are configured to coherently transmit and receive optical data based on the optical signal waveform representation. The electrical processing engine circuit can be configured to perform optical modulation and demodulation based on the optical signal waveform representation, in addition to the data processing. The data processing can include networking functions including any of switching, routing, multicast, and load balancing. The data processing can include direct data processing functions on payload data. The electrical processing engine circuit can be virtualized for the data processing and the optical modulation and demodulation.

An optical data rate of the optical data can be less than an electrical data rate of the optical signal waveform representation. The one or more co-packaged coherent optical IO modules can include standards-compliant mechanical and electrical interfaces in the electrical circuit package. The one or more co-packaged coherent optical IO modules can be configured to perform complex-field optical modulation and coherent intradyne demodulation. The one or more co-packaged coherent optical IO modules can include Digital-to-Analog Converter (DAC) and Analog-to-Digital Converter (ADC) functions for converting between digital interfaces and analog optical de/modulation. The electrical processing engine circuit can be configured to implement Machine Learning for the optical signal waveform representation. The Machine Learning can include transmitter-based Machine Learning based signal encoding and constellation shaping in a data path of every data-carrying signal, with periodic training, and receiver-based equalization and decoding in a data path of every data-carrying signal, with periodic training. The periodic training can be based on a periodic sampling of one of a transmitted waveform and a received waveform at a time to conserve electrical processing engine circuit resources, with performance metrics obtained from a receiver at an opposite side of a communication link. The periodic training can be performed under control of user specified policy based on any of throughput, latency, spectral efficiency, format interoperability compliance, security, and robustness. The electrical processing engine circuit can be a commercial off the shelf (COTS) circuit configured with a programming language.

In another embodiment, a system includes an inference processing engine circuit; a switching engine circuit; a training engine circuit; and one or more co-packaged coherent optical Input/Output (IO) modules interconnected to the switching engine circuit, wherein the switching engine circuit is configured to interface electrical data including an optical signal waveform representation to each of the one or more co-packaged coherent optical IO modules, and wherein the one or more co-packaged coherent optical IO modules are configured to coherently transmit and receive optical data based on the optical signal waveform representation. The training engine circuit can be configured to periodically sample one of optical channels and perform Machine Learning based training and optimization, and pass a model to the inference processing engine circuit for modulation and demodulation. The switching engine circuit can include networking functions including any of switching, routing, multicast, and load balancing.

In a further embodiment, a method includes processing data in an electrical processing engine circuit configured to perform data processing; interfacing an optical signal waveform representation to each of one or more co-packaged coherent optical Input/Output (IO) modules that are co-packaged with the electrical processing engine circuit; and transmitting and receiving optical data based on the optical signal waveform representation. The method can further include implementing Machine Learning for the optical signal waveform representation in the electrical processing engine circuit. The method can further include periodically training the Machine Learning based on periodic sampling of one of a transmitted waveform and a received waveform at a time to conserve electrical processing engine circuit resources, with performance metrics obtained from a receiver at an opposite side of a communication link.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Again, the present disclosure relates to systems and methods for optical interconnects for a programmable virtualized self-optimizing signal processor. Specifically, optical IO is replaced by a Coherent Electrical-Optical-Electrical (EOE) converter that converts between an electrical digitized waveform and optical signal. The electrical digitized waveform is passed to/from an off-the-shelf external electronic processing engine (e.g., commercial FPGA or GPU), such that signal de/modulation and processing, conditioning and optimization occurs in the electronic processing engine. The electronic processing engine can implement Machine Learning (ML) inference type signal decoding. In an embodiment, a separate ML engine periodically samples one of optical channels and performs ML-based training and optimization, and then passes new learned model to the real-time inference engine. Thus, Modem adaptation occurs in-service and in real-time. Adaptation can be controlled by user-defined policies and may be throughput, latency, spectral efficiency, format interoperability compliance, security, robustness, etc., and which may be dynamically changed in-service. Advantageously, this enables long-reach from co-packaged optical IO, such as addressing dynamically and flexibly optimizable optical modem targeting a wide variety of use cases including data center, Metro, long haul and RF antenna remoting optical links, all performed under user-specified policies. That is, these applications can avoid intermediate transponders, reducing cost, complexity, and the like.

Problem Statement

The present disclosure seeks to address several problems currently encountered in optical communication systems. First, the need for optical modems with programmable capability for handling different modulation formats and encoding/decoding schemes. Second, in-service, real-time functional optimization to adapt to uncertain field deployments and heterogenous optical line system supplier base and fiber infrastructure. Third, policy-based optimization along dimensions such as throughput, latency, spectral efficiency, format interoperability compliance, security, robustness, etc., which may be dynamically changed in-service. Fourth, using the smallest amount possible of hard-wired, custom modem elements, and instead, adapting commercial industry-wide technologies from other areas into Modem designs.

The present disclosure provides coherent optical IO co-packaging, software programmable infrastructure, and cost reductions. The coherent optical IO co-packaging with an electrical processing engine can be used to provide a unified and programmable infrastructure for Compute, Connect, and Infer/Act functions, such as described in commonly-assigned U.S. patent application Ser. No. 16/849,129, "Self-optimizing fabric architecture and self-assembling network," the contents of which are incorporated by reference.

Baseline Co-Packaged Optical IO

Figure 1:
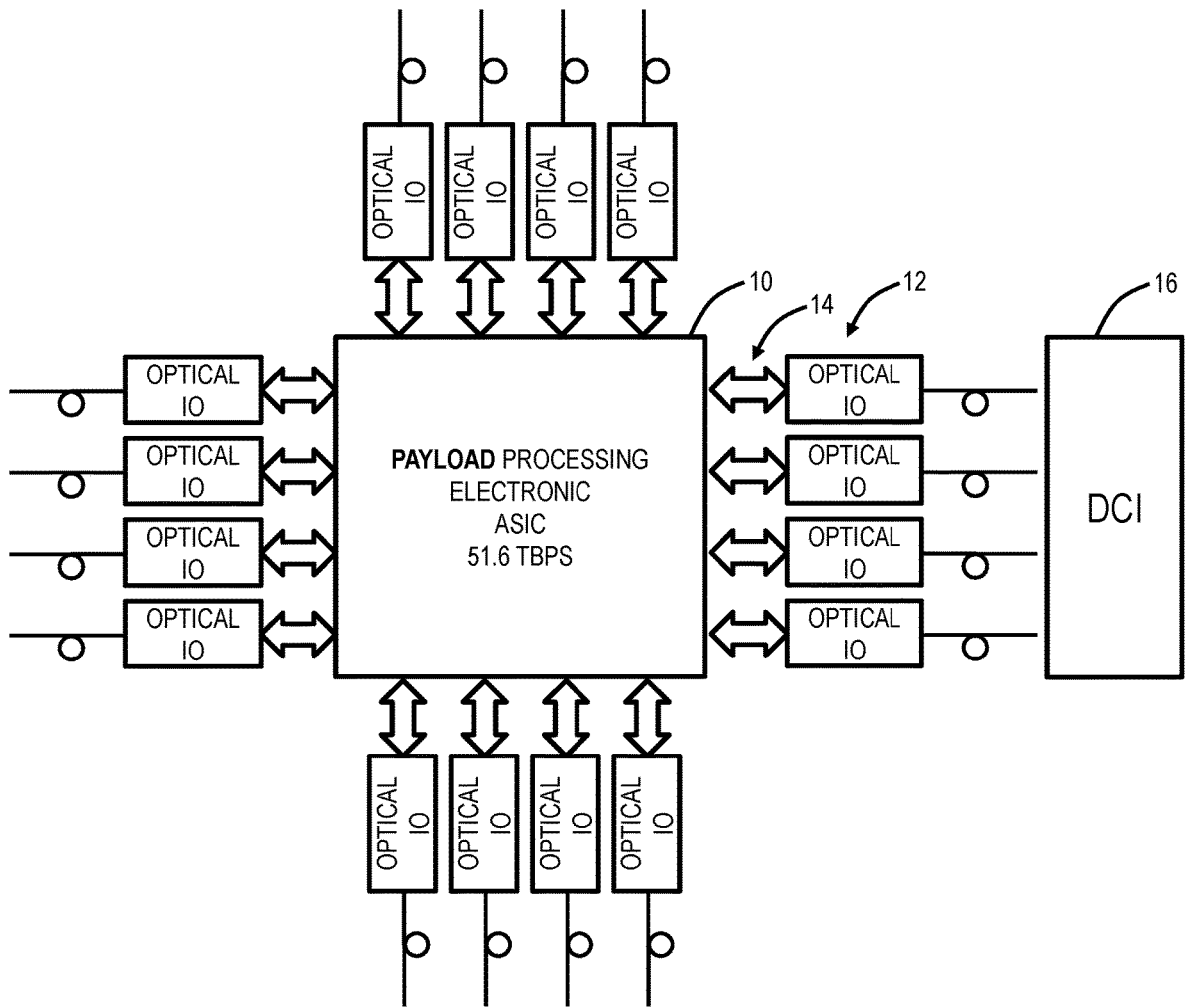
FIG. 1 is a block diagram of an electronic processing engine with baseline (conventional) optical IO.

FIG. 1 is a block diagram of an electrical processing engine 10 with baseline (conventional) optical IO. The electrical processing engine 10 can be an FPGA, CPU, GPU, TPU, ASIC, etc. The electrical processing engine 10 is a programmable virtualized signal processor. For example, the electrical processing engine 10 can include processing capabilities of 51.6 Tbps. The electrical processing engine 10 is an electrical circuit package. Conventionally, electrical circuit packages can use Ball Grid Array (BGA) for electrical interconnect. At 50 Tbps or so, electrical interconnect is at its physical bandwidth limits. As such, the electrical processing engine 10 can include co-packaged optical IO modules 12. In this example, there are 16 co-packaged optical IO modules 12, each electrically connected to the electrical processing engine 10 via interconnects 14, e.g., each including 3.2 Tbps. The co-packaged optical IO modules 12 are located in the same electrical circuit package as the electrical processing engine 10. Each of the co-packaged optical IO modules 12 includes components for optical signal modulation and demodulation and lasers may be internal or external to the co-packaged optical IO modules 12, and the interconnects 14 enable direct payload data transfer to/from the electrical processing engine 10.

In this conventional approach, the optical data rate of the co-packaged optical IO modules 12 is approximately equal to the electrical data rate. The electrical processing engine 10 performs data processing of the payload data and the co-packaged optical IO modules 12 perform input/output of the payload data to/from the electrical processing engine 10. Of note, the electrical processing engine 10 with the co-packaged optical IO modules 12 includes standards-compliant mechanical and standards-compliant electrical interface implementations.

As described herein, the use case of the co-packaged optical IO modules 12 is for short-reach interconnect, such as to a Data Center Interconnect (DCI) network element 16.

The network element 16 includes transponders for interconnect less than short-reach (e.g., <2 km). Also, the co-packaged optical IO modules 12 can be connected to other, local devices. The conventional specifications for the co-packaged optical IO modules 12 include NRZ and PAM. For example, the co-packaged optical IO modules 12 can have multiple fibers (ribbon cables) supporting 100 Gbps per fiber. Evolving implementations include Coarse Wavelength Division Multiplexing (CWDM) supporting 4 wavelengths per fiber (400 Gbps).

Proposed Solution

Electrical processing circuits, such as the electrical processing engine 10, are continuing to rapidly gain in capability, providing off-the-shelf performance in many cases exceeding custom ASIC development. Also, Machine Learning algorithms are developing rapidly in both performance and efficiency, with applications to signal processing, signal optimization, etc. Industry Multi-Source Agreement (MSA) activities are providing designs for widely adopted, low-cost solutions to optical packaging, electrical sockets, chip-chip interconnects and corresponding Serializer-Deserializer (SERDES) libraries, etc. Importantly, these provide low-power Terabit level electrical interconnects between components. Of note, the electrical processing capability of the electrical processing engine 10 exceeds the ability of IO. As such, the present disclosure includes the use of the electrical processing engine 10 for optical signal processing, in addition to its other functions.

Figure 2:
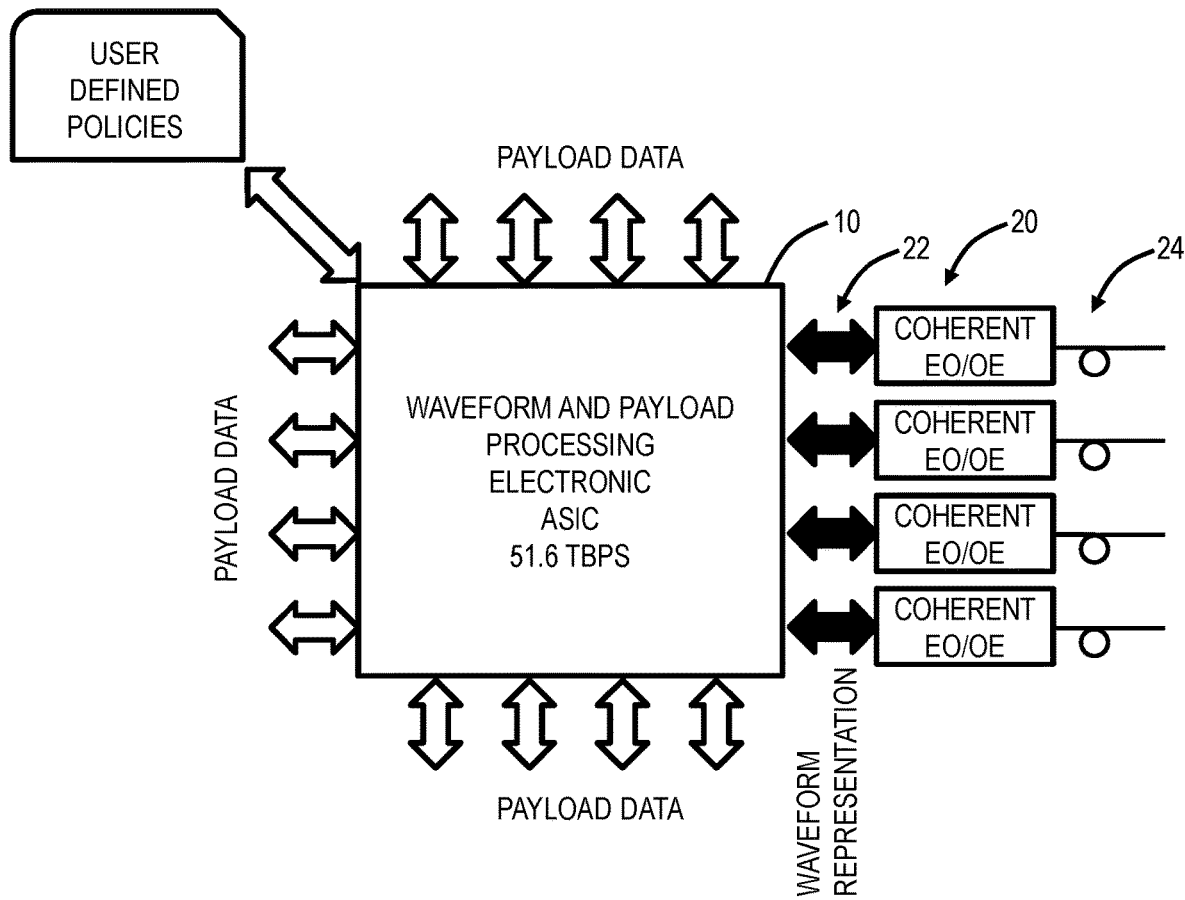
FIG. 2 is a block diagram of the electrical processing engine with co-packaged coherent optical IO modules.

FIG. 2 is a block diagram of the electrical processing engine 10 with co-packaged coherent optical IO modules 20. The co-packaged coherent optical IO modules 20 can be Electrical-Optical/Optical-Electrical (EO/OE) Photonic Integrated Circuits (PICs). In this example, the electrical processing engine 10 includes four coherent optical IO modules 20 replacing the co-packaged optical IO modules 12. Of course, there can be more or fewer coherent optical IO modules 20. Instead of the electrical interconnect 14, the coherent optical IO modules 20 are connected to the electrical processing engine 10 via interconnects 22 that includes an electrical digitized waveform, i.e., a waveform representation. The electrical digitized waveform is passed to/from electrical processing engine 10 (commercial FPGA or GPU), such that signal de/modulation and processing, conditioning and optimization occurs in the electrical processing engine 10.

The coherent optical IO modules 20 are located in standards-compliant packaging and sockets with the electrical processing engine 10 in an electrical circuit package. This approach with the coherent optical IO modules 20 also includes standards-compliant mechanical and standards-compliant electrical interface implementations. Each of the coherent optical IO modules 20 includes components for optical signal transmission and reception, and lasers may be internal or external to the coherent optical IO modules 20. The optical signal modulation and demodulation occurs in the electrical processing engine 10, with the modulated waveform representation transfer to/from the electrical processing engine 10.

The coherent optical IO modules 20 provide optical data as a modulated waveform on its interfaces 24. The electrical data on the interconnects 22 represents the optical signal waveform converted to baseband. As such, the optical data rate <<electrical waveform rate. In an embodiment, the electrical waveform representation on the interconnects 22 can be 70 GBaud×2 polarizations×2 IQ×5=1400 Gbps, and the interfaces 24 can include 400 Gbps of optical coherent data signal.

Also, in addition to the coherent optical IO modules 20, this can be extended to include RF over fiber links (e.g., Common Public Radio Interface (CPRI)), such as for satellite and 5G signals for antenna remoting, etc.

With the integration of the coherent optical IO modules 20, the DCI network element 16 can be removed, allowing direct connection from the electrical processing engine 10 to remote locations (e.g., 80 km or more). An example use case is data center interconnection.

Waveform Processing

Figure 3:
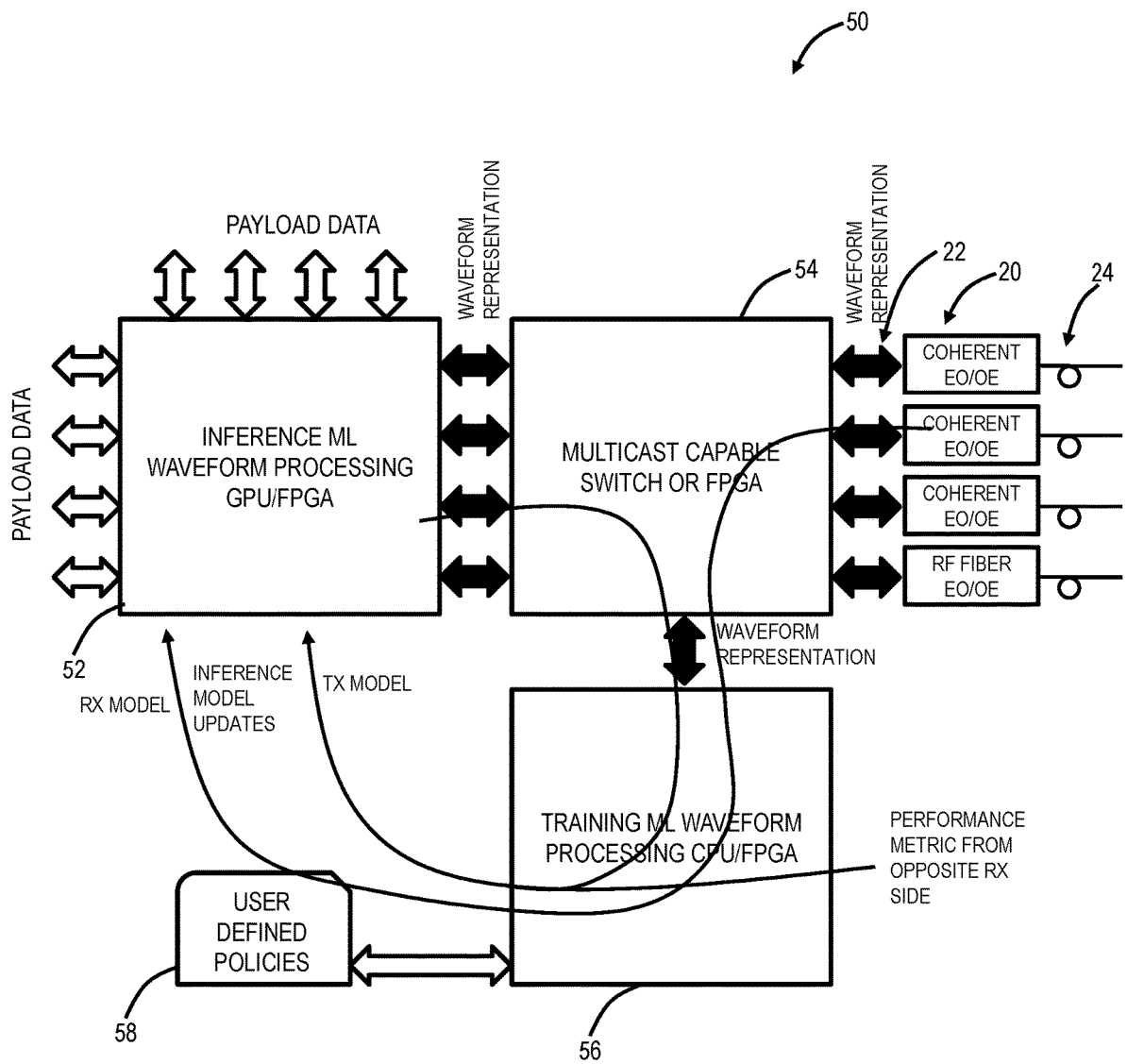
FIG. 3 is a block diagram of a co-packaged system with an inference ML processing engine, a switching engine, and a training engine.

FIG. 3 is a block diagram of a co-packaged system 50 with an inference ML processing engine 52, a switching engine 54, and a training engine 56. The engines 52, 54, 56 can each be a programmable virtualized self-optimizing signal processor. The co-packaged system 50 includes the coherent optical IO modules 20 and a collection of (possibly virtualized) computing engines 52, 54, 56 that fulfill functions of dynamic signal encoding and conditioning, signal decoding, ML training, and signal multicast as needed. The engines 10, 52, 54 can be GPUs, ASICs, FPGAs, CPUs, TPUs, etc., and each can be a different type of circuit. Those skilled in the art will recognize this is one example implementation with the co-packaged coherent optical IO modules 20, and other embodiments are also contemplated. For example, in some embodiments, a single engine could support all of these functions. The engines 52, 54, 56 in the co-packaged system 50 in FIG. 3 could be combined. In an embodiment, the engines 52, 54, 56 can be commercial off the shelf (COTS) circuit, i.e., processing ASICs, which could be FPGA, GPU, CPU, etc. All of these are highly efficient for a set of algorithms and programmable using open, accessible programming languages.

The inference ML processing engine 52 can implement ML Inference type signal decoding, and can be configured to receive the waveform representation from the switching engine 54. The switching engine 54 can perform traffic processing (e.g., packet switching) and can communicate with the coherent optical IO modules 20 via the interconnects 22 as described with reference to the electrical processing engine 10. The training engine 56 can connect to the switching engine 54 for the waveform representation. The switching engine 54 is a ML engine that periodically samples one of optical channels and performs ML-based training and optimization, and then passes new learned model to the real-time inference engine. Thus, modem adaptation occurs in-service and in real-time. The ML-based training can form a receiver (Rx) model and a transmitter (Tx) model as well as provide updates to the inference ML processing engine 52. The models can be based on the waveform representation as well as from performance feedback from an opposite side Rx.

Adaptation is controlled by user-defined policies 58, and may be throughput, latency, spectral efficiency, format interoperability compliance, security, robustness, etc., and which may be dynamically changed in-service.

Again, a key aspect is the fact that processing capabilities of circuits is exceeding the IO interconnect capability. As such, the present disclosure contemplates using some of the processing capability for coherent optical modulation/demodulation, enabling the co-packaged coherent optical IO modules 20. Algorithms are programmed into a type of ASIC that is best suited for it. For example, networking and switching functions may be deployed on an FPGA, while Machine Learning training and processing may be deployed on a GPU, and overall system control plane deployed on a CPU. Computation engines 52, 54, 56 may be 'virtualized' along two dimensions: a) single ASIC may be split into sub-ASICs if its resources are underutilized, or b) multiple ASICs may be combined into a larger one if their resource are insufficient individually. As described herein, the computation engines 52, 54, 56 can be referred to as ASICs.

Machine learning (ML) algorithms can be applied to the area of communication signal optimization. Existing approaches use ML to optimize signal constellation, encoding, and decoding for RF wireless communication. See, e.g., T. O'Shea and J. Hoydis, "An Introduction to Deep Learning for the Physical Layer," in IEEE Transactions on Cognitive Communications and Networking, vol. 3, no. 4, pp. 563-575, December 2017, doi: 10.1109/TCCN.2017.2758370, the contents of which are incorporated by reference. Additionally, ML algorithms have been applied for off-line constellation optimization in optical links. See, e.g., R. T. Jones, T. A. Eriksson, M. P. Yankov and D. Zibar, "Deep Learning of Geometric Constellation Shaping Including Fiber Nonlinearities," 2018 European Conference on Optical Communication (ECOC), Rome, 2018, pp. 1-3, doi: 10.1109/ECOC.2018.8535453, the contents of which are incorporated by reference. Further, ML techniques have been described for receiver side signal equalization. See, e.g., L. Yi, T. Liao, L. Huang, L. Xue, P. Li and W. Hu, "Machine Learning for 100 Gb/s/λ, Passive Optical Network," in Journal of Lightwave Technology, vol. 37, no. 6, pp. 1621-1630, 15 Mar. 2019, doi: 10.1109/JLT.2018.2888547, the contents of which are incorporated by reference.

Transmitter-based Machine Learning based signal encoding and constellation shaping is implemented in the data path of every data-carrying signal. Training is based on a periodic sampling of one of the transmitted waveforms at a time to conserve ASIC resources, while performance metrics are obtained from the receiver at the opposite side of the communication link.

Receiver-based equalization and decoding is implemented in the data path of every data-carrying signal. Training is based on a periodic sampling of one of the received waveforms at a time to conserve ASIC resources, while performance metrics are obtained from the same receiver.

Both training and optimization are performed under control of user specified policy along dimensions such as throughput, latency, spectral efficiency, format interoperability compliance, security, robustness, etc., which may be dynamically changed in-service.

The coherent optical IO modules 20 are provided external to the processing ASICs, preferably in a standards-compliant package with standards-compliant electrical signal interfaces. Again, unlike existing optical interfaces which transfer payload data, this EO/OE interface will provide a representation of the optical signal waveform to the processing ASIC. The coherent optical IO modules 20 can implement complex-field optical modulation and coherent intradyne demodulation. The coherent optical IO modules 20 may include Digital-to-Analog Converter (DAC) and Analog-to-Digital Converter (ADC) functions for converting between digital interfaces and analog optical de/modulation. The coherent optical IO modules 20 may also include some amount of signal conditioning that is independent of the programmable functions implemented in the ASIC.

In addition to signal manipulation and optimization, ASICs may implement standard networking functions such as switching, routing, multicast, load balancing, etc. via manipulation of framing and payload data. Further, the ASICs may also implement direct data processing functions on payload data, as for example, image recognition, speech to text conversion, sensor data processing, etc.

Co-Packaging

The present disclosure leverages the co-packaged optics efforts. In FIG. 2, for example, the engine 10 can be an ASIC as a bare die and the coherent optical IO modules 20 can be bare die PICs. These can sit on a separate interposer (2.5D integration), or flip-chipped onto each other (3D integration). Then, the complete assembly could be inside a single package with, for example, BGA attach for PCB placement. Fiber connections come into the package also, either as integrated or possibly connectorized.

In FIG. 3, for example, in one embodiment, the engines 52, 54, 56 could similarly be in a same package as above. In another embodiment, the engine 54 can be in a same package as the coherent optical IO modules 20, as above. The other engines 52, 56 can be in separate packages.

Process

Figure 4:
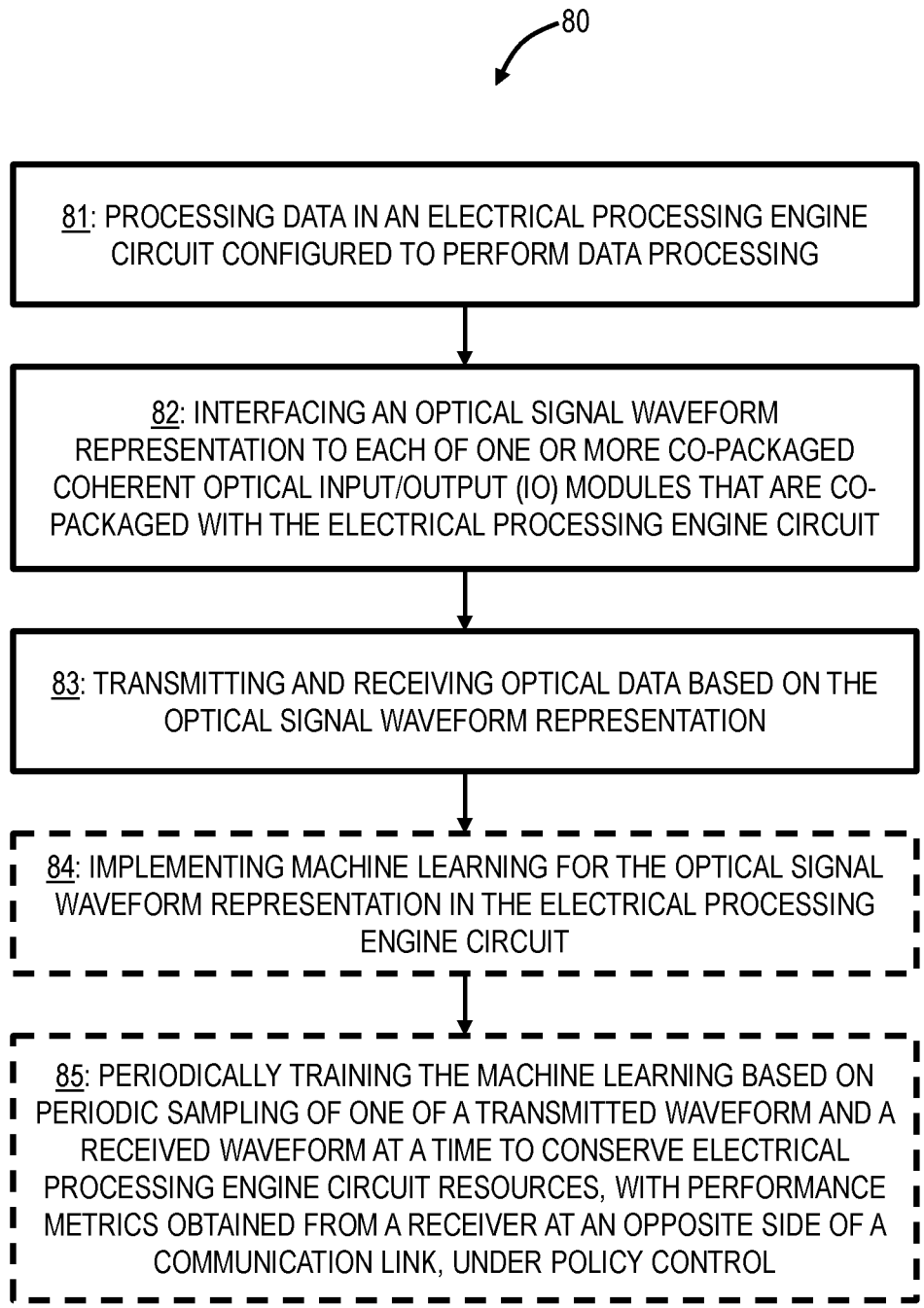
FIG. 4 is a flowchart of a process for a programmable virtualized self-optimizing signal processor.

FIG. 4 is a flowchart of a process 80 for a programmable virtualized self-optimizing signal processor. The process 80 contemplates operation via the engine 10, the coherent optical IO modules 20, and/or the engines 52, 54, 56. The process 80 includes processing data in an electrical processing engine circuit configured to perform data processing (step 81); interfacing an optical signal waveform representation to each of one or more co-packaged coherent optical Input/Output (IO) modules that are co-packaged with the electrical processing engine circuit (step 82); and transmitting and receiving optical data based on the optical signal waveform representation (step 83).

The process 80 can further include implementing Machine Learning for the optical signal waveform representation in the electrical processing engine circuit (step 84). The process 80 can also further include periodically training the Machine Learning based on periodic sampling of one of a transmitted waveform and a received waveform at a time to conserve electrical processing engine circuit resources, with performance metrics obtained from a receiver at an opposite side of a communication link (step 85), such as under policy control.

Both training and optimization are performed under control of user specified policy along dimensions such as throughput, latency, spectral efficiency, format interoperability compliance, security, robustness, etc., which may be dynamically changed in-service.

It will be appreciated that some embodiments described herein may include or utilize one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field-Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured to," "logic configured to," etc. perform a set of operations, steps, methods, processes, algorithms, functions, techniques, etc. on digital and/or analog signals as described herein for the various embodiments.

Moreover, some embodiments may include a non-transitory computer-readable medium having instructions stored thereon for programming a computer, server, appliance, device, processor, circuit, etc. to perform functions as described and claimed herein. Examples of such non-transitory computer-readable medium include, but are not limited to, a hard disk, an optical storage device, a magnetic storage device, a Read-Only Memory (ROM), a Programmable ROM (PROM), an Erasable PROM (EPROM), an Electrically EPROM (EEPROM), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. An electrical circuit package comprising:
   an electrical processing engine circuit configured to perform data processing; and
   one or more co-packaged coherent optical Input/Output (IO) modules interconnected to the electrical processing engine circuit,
   wherein the electrical processing engine circuit is configured to interface electrical data including an optical signal waveform representation to each of the one or more co-packaged coherent optical IO modules, and wherein the one or more co-packaged coherent optical IO modules are configured to coherently transmit and receive optical data based on the optical signal waveform representation,
   wherein the electrical processing engine circuit is configured to implement Machine Learning for the optical signal waveform representation, wherein the Machine Learning includes transmitter-based Machine Learning based signal encoding and constellation shaping in a data path of every data-carrying signal, with periodic training, and receiver-based equalization and decoding in a data path of every data-carrying signal, with periodic training.

2. The electrical circuit package of claim 1, wherein the electrical processing engine circuit is configured to perform optical modulation and demodulation based on the optical signal waveform representation, in addition to the data processing.

3. The electrical circuit package of claim 2, wherein the data processing includes networking functions including any of switching, routing, multicast, and load balancing.

4. The electrical circuit package of claim 2, wherein the data processing includes direct data processing functions on payload data.

5. The electrical circuit package of claim 2, wherein the electrical processing engine circuit is virtualized for the data processing and the optical modulation and demodulation.

6. The electrical circuit package of claim 1, wherein an optical data rate of the optical data is less than an electrical data rate of the optical signal waveform representation.

7. The electrical circuit package of claim 1, wherein the one or more co-packaged coherent optical IO modules include standards-compliant mechanical and electrical interfaces in the electrical circuit package.

8. The electrical circuit package of claim 1, wherein the one or more co-packaged coherent optical IO modules are configured to perform complex-field optical modulation and coherent intradyne demodulation.

9. The electrical circuit package of claim 1, wherein the one or more co-packaged coherent optical IO modules include Digital-to-Analog Converter (DAC) and Analog-to-Digital Converter (ADC) functions for converting between digital interfaces and analog optical de/modulation.

10. The electrical circuit package of claim 1, wherein the periodic training is based on a periodic sampling of one of a transmitted waveform and a received waveform at a time to conserve electrical processing engine circuit resources, with performance metrics obtained from a receiver at an opposite side of a communication link.

11. The electrical circuit package of claim 1, wherein the periodic training is performed under control of user specified policy based on any of throughput, latency, spectral efficiency, format interoperability compliance, security, and robustness.

12. The electrical circuit package of claim 1, wherein the electrical processing engine circuit is a commercial off the shelf (COTS) circuit configured with a programming language.

13. A system comprising:
    an inference processing engine circuit;
    a switching engine circuit;
    a training engine circuit; and
    one or more co-packaged coherent optical Input/Output (IO) modules interconnected to the switching engine circuit,
    wherein the switching engine circuit is configured to interface electrical data including an optical signal waveform representation to each of the one or more co-packaged coherent optical IO modules, and wherein the one or more co-packaged coherent optical IO modules are configured to coherently transmit and receive optical data based on the optical signal waveform representation, and
    wherein the training engine circuit is configured to periodically sample one of optical channels and perform Machine Learning based training and optimization, and pass a model to the inference processing engine circuit for modulation and demodulation.

14. The system of claim 13, wherein the switching engine circuit includes networking functions including any of switching, routing, multicast, and load balancing.

15. A method comprising:
    processing data in an electrical processing engine circuit configured to perform data processing;
    interfacing an optical signal waveform representation to each of one or more co-packaged coherent optical Input/Output (IO) modules that are co-packaged with the electrical processing engine circuit;
    transmitting and receiving optical data based on the optical signal waveform representation; and periodically training Machine Learning based on periodic sampling of one of a transmitted waveform and a received waveform at a time to conserve electrical processing engine circuit resources, with performance metrics obtained from a receiver at an opposite side of a communication link.

16. The method of claim 15, further comprising implementing Machine Learning for the optical signal waveform representation in the electrical processing engine circuit.

\* \* \* \* \*